US009768911B2

(12) United States Patent
Bakulin et al.

(10) Patent No.: US 9,768,911 B2
(45) Date of Patent: Sep. 19, 2017

(54) SYSTEM AND METHOD FOR DESIGNING CONSTELLATIONS AND USE THEREOF

(71) Applicant: Huawei Technologies Co., Ltd., Shenzhen (CN)

(72) Inventors: Mikhail Germanovich Bakulin, Moskovskaya obl. (RU); Vitaly Borisovich Kreyndelin, Moscow (RU); Gennady Vladimirovich Ovechkin, Ryazan (RU); Javad Abdoli, Kanata (CA); Peiying Zhu, Kanata (CA); Ming Jia, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 78 days.

(21) Appl. No.: 14/737,336

(22) Filed: Jun. 11, 2015

(65) Prior Publication Data

US 2016/0365945 A1 Dec. 15, 2016

(51) Int. Cl.
*H04L 1/00* (2006.01)
*H04L 1/20* (2006.01)

(52) U.S. Cl.
CPC .......... *H04L 1/0041* (2013.01); *H04L 1/0006* (2013.01); *H04L 1/0045* (2013.01); *H04L 1/203* (2013.01)

(58) Field of Classification Search
CPC ... H04L 1/0045; H04L 1/0041; H04L 1/0061; H04L 1/1845; H04L 1/0006; H04L 1/203
See application file for complete search history.

(56) References Cited

U.S. PATENT DOCUMENTS

| | | | | |
|---|---|---|---|---|
| 8,660,205 | B2 * | 2/2014 | Djordjevic | H04L 27/3411 370/483 |
| 2009/0304097 | A1 * | 12/2009 | Han | H04L 27/2618 375/260 |
| 2010/0225752 | A1 | 9/2010 | Bench et al. | |
| 2013/0215942 | A1 | 8/2013 | Addepalli et al. | |

FOREIGN PATENT DOCUMENTS

| | | | |
|---|---|---|---|
| CN | 102201899 | A | 9/2011 |
| CN | 102833043 | A | 12/2012 |
| CN | 103259760 | A | 8/2013 |
| CN | 104079357 | A | 10/2014 |

OTHER PUBLICATIONS

Laster et al., Bit error rate estimation using probability density function estimators, Jan. 2003, IEEE, trans. on vehicular technology, vol. 51, No. 1, pp. 260-267.*

Cumplido et al., High payload data hiding in audio signals based on a modified OFDM approach, Oct. 2012, Google.com, pp. 1 to 36. (retrieved from google.com Oct. 24, 2016).*

(Continued)

*Primary Examiner* — Shelly A Chase
(74) *Attorney, Agent, or Firm* — Slater Matsil, LLP

(57) ABSTRACT

A method for operating a transmitting device includes mapping data to a transmission symbol in accordance with a constellation map assigned to a receiving device, wherein the constellation map is designed in accordance with a posteriori error rate derived from a transmitted signal, and transmitting the transmission symbol.

21 Claims, 11 Drawing Sheets

400

START

405 RECEIVE MULTI-DIMENSIONAL CONSTELLATION AND SIGNAL MAPPED USING MULTI-DIMENSIONAL CONSTELLATION

410 DETERMINE A POSTERIORI ERROR RATE

415 SEND THE A POSTERIORI ERROR RATE

END

(56) References Cited

OTHER PUBLICATIONS

Murphy et al., A Gram-Charlier series method for calculating general signal constellation error probabilities, Feb. 2012, IEEE trans on Comm. vol., 60, No. 2, pp. 300-305.*
Foschini, G. J., et al., "Optimization of Two-Dimensional Signal Constellations in the Presence of Gaussian Noise," IEEE Transactions on Communications, vol. Com-22, No. 1, Jan. 1974, pp. 28-38.
Kayhan, F., et al., "Constellation Design for Memoryless Phase Noise Channels," IEEE Transactions on Wireless Communications, vol. 13, No. 5, May 2014, pp. 2874-2883.
Koike-Akino, T., et al., "Sphere Packing Optimization and EXIT Chart Analysis for Multi-Dimensional QAM Signaling," IEEE Communications Society, Jun. 14-18, 2009, pp. 1-5.

* cited by examiner

SYSTEM AND METHOD FOR DESIGNING CONSTELLATIONS AND USE THEREOF

TECHNICAL FIELD

The present disclosure relates generally to digital communications, and more particularly to a system and method for designing constellations and use thereof.

BACKGROUND

Generally, a constellation includes a plurality of constellation points arranged in a particular configuration. The constellation represents a mapping of digital data to a carrier signal or carrier wave and vice versa. For example, in quadrature amplitude modulation, the amplitudes of two waves that are 90 degrees out-of-phase with each other are modulated to represent the digital data.

SUMMARY OF THE DISCLOSURE

Example embodiments of the present disclosure which provide a system and method for designing constellations and use thereof.

In accordance with an example embodiment of the present disclosure, a method for operating a transmitting device is provided. The method includes mapping, by the transmitting device, data to a transmission symbol in accordance with a constellation map assigned to a receiving device, wherein the constellation map is designed in accordance with a posteriori error rate derived from a transmitted signal, and transmitting, by the transmitting device, the transmission symbol.

In accordance with another example embodiment of the present disclosure, a method for operating a receiving device is provided. The method includes receiving, by the receiving device, a transmission symbol from a transmitting device, de-mapping, by the receiving device, the transmission symbol in accordance with a constellation map thereby producing received data, wherein the constellation map is designed in accordance with a posteriori error rate derived from a transmitted signal, and processing, by the receiving device, the received data.

In accordance with another example embodiment of the present disclosure, a transmitting device is provided. The transmitting device includes a processor, and a non-transitory computer readable storage medium storing programming for execution by the processor. The programming including instructions to map data to a transmission symbol in accordance with a constellation map assigned to a receiving device, wherein the constellation map is designed in accordance with a posteriori error rate derived from a transmitted signal, and transmit the transmission symbol.

In accordance with another example embodiment of the present disclosure, a receiving device is provided. The receiving device includes a processor, and a non-transitory computer readable storage medium storing programming for execution by the processor. The programming including instructions to receive a transmission symbol from a transmitting device, de-map the transmission symbol in accordance with a constellation map thereby producing received data, wherein the constellation map is designed in accordance with a posteriori error rate derived from a transmitted signal, and process the received data.

One advantage of an embodiment is that the techniques presented herein are operable in lower signal to noise ratio (SNR) environments.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to designing constellations and use thereof. For example, a device designs a constellation map in accordance with a posteriori error rate derived from a signal, and prompts the constellation map to be used for communicating signals in a communications system.

The present disclosure will be described with respect to example embodiments in a specific context, namely communications systems that use constellations. The disclosure may be applied to standards compliant communications systems, such as those that are compliant with Third Generation Partnership Project (3GPP), IEEE 802.11, and the like, technical standards, and non-standards compliant communications systems, that use constellations.

Figure 1:
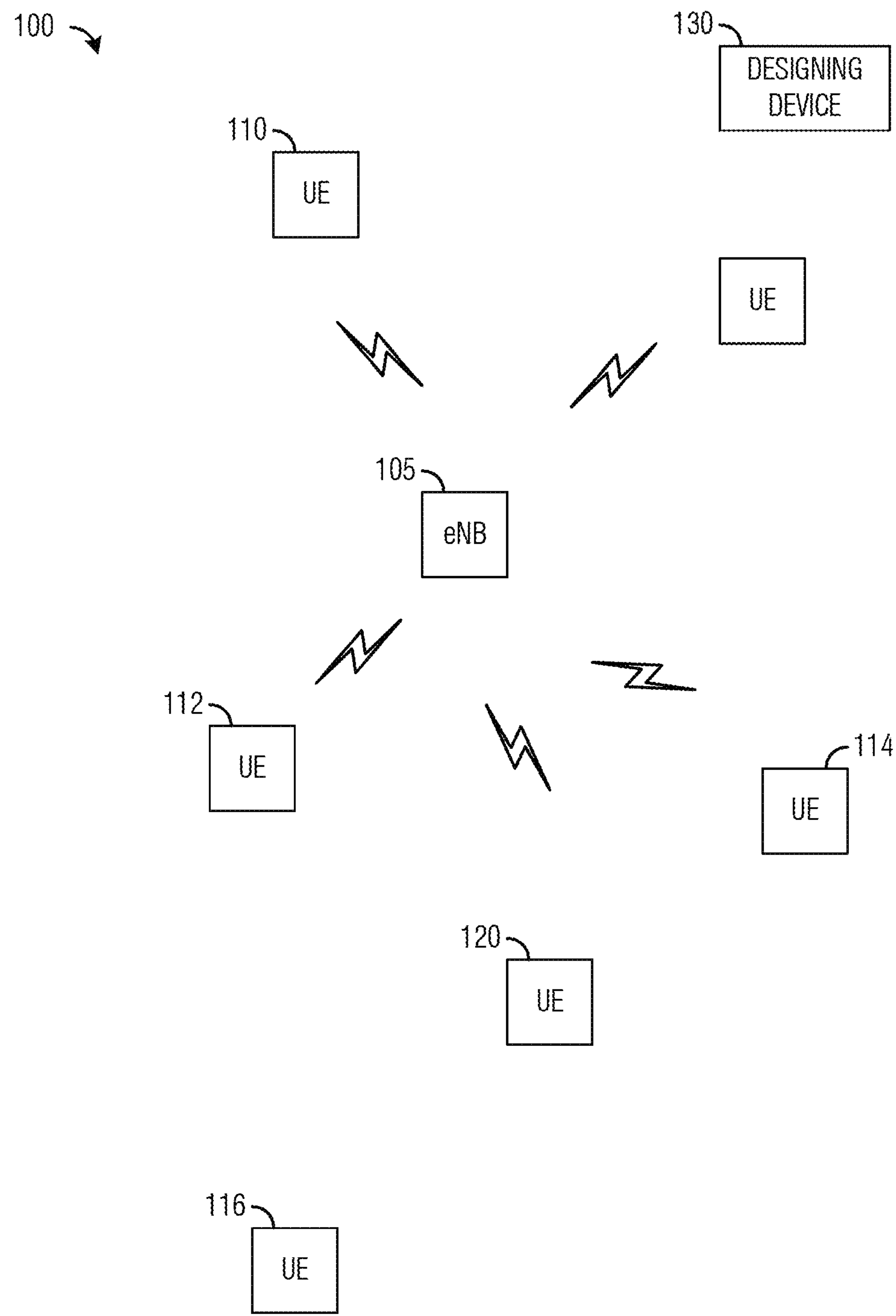
FIG. 1 illustrates an example communications system according to example embodiments described herein.

FIG. 1 illustrates an example communications system 100. Communications system 100 includes an evolved NodeB (eNB) 105 serving a plurality of user equipments (UEs). In general, transmissions to and from UEs may go through eNB 105 using resources allocated by eNB 105. However, in an alternative communications mode, communications between two UEs may be made without having eNB 105 serve as an intermediary. eNBs may also be commonly referred to as NodeBs, base stations, access points, controllers, base terminal stations, and the like, while UEs may also be commonly referred to as mobiles, mobile stations, stations, terminals, subscribers, users, and the like.

While it is understood that communications systems may employ multiple eNBs capable of communicating with a number of UEs, only one eNB, and a number of UEs are illustrated for simplicity.

In a communications system that utilizes constellations, digital data is mapped onto a carrier waveform or carrier signal (and vice versa) using a constellation map. The constellation map may be a one-dimensional constellation map or a multi-dimensional constellation map. Communications system 100 also includes a designing device 130. Designing device 130 designs constellations (such as one-dimensional constellations, and multi-dimensional constellations) for devices in communications system 100. Designing device 130 may design the constellations in accordance with the example embodiments described herein. Designing device 130 may provide the constellations to the devices in communications system 100. Designing device 130 may store the constellations in a memory or a database.

Figures 2A, 2B:
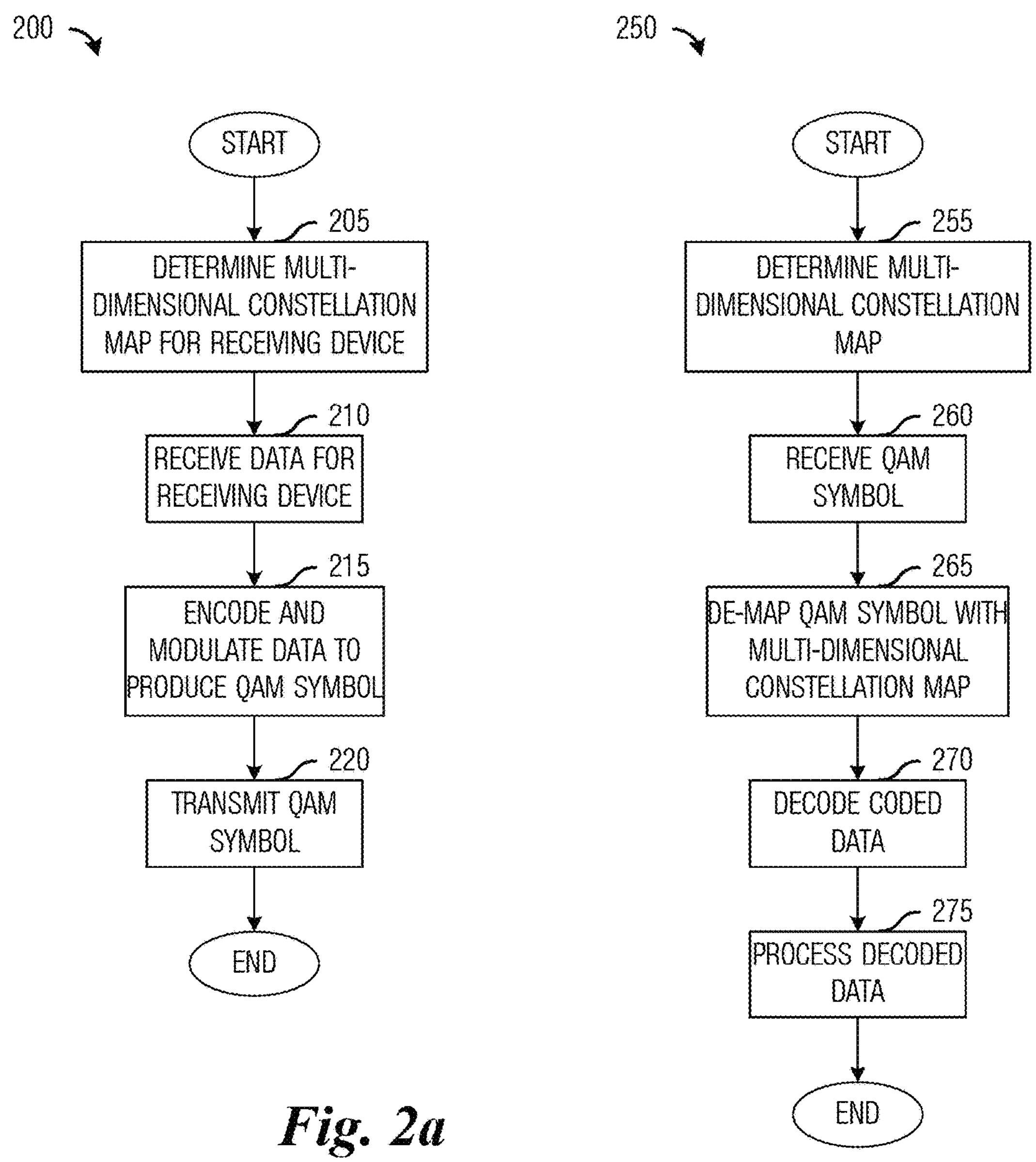
FIG. 2*a* illustrates a flow diagram of example operations occurring in a transmitting device when making a transmission according to example embodiments described herein.
FIG. 2*b* illustrates a flow diagram of example operations occurring in a receiving device when receiving a transmission according to example embodiments described herein.

FIG. 2*a* illustrates a flow diagram of example operations 200 occurring in a transmitting device when making a transmission. Operations 200 may be indicative of operations occurring in a transmitting device, such as an eNB in a downlink transmission or a UE in an uplink transmission.

Operations 200 may begin with the transmitting device determining a constellation map (one-dimensional or multi-dimensional) for a receiving device (block 205). Without loss of generality, the terms constellation and constellation map may be used interchangeably. The transmitting device may assign a constellation map to the receiving device, retrieve a constellation map assignment for the receiving device from memory (remote or local), retrieve a constellation map assignment for the receiving device from a server (remote or local), the transmitting device may generate the constellation map for the receiving device, and the like. The transmitting device may receive data intended for the receiving device (block 210). The transmitting device may encode and modulate the received data in accordance with the constellation map (block 215). The encoding and modulating of the received data produces one or more QAM symbols. The transmitting device may transmit the one or more QAM symbols (block 220).

FIG. 2*b* illustrates a flow diagram of example operations 250 occurring in a receiving device when receiving a transmission. Operations 250 may be indicative of operations occurring in a receiving device, such as a UE in a downlink transmission or an eNB in an uplink transmission.

Operations 250 may begin with the receiving device determining a constellation map (one-dimensional or multi-dimensional) (block 255). The receiving device may be assigned a constellation map that is signaled to it in a message, retrieve a constellation map assignment from memory (remote or local), retrieve a constellation map assignment from a server (remote or local), the receiving device may assign itself a constellation map, and the like. The receiving device may receive a QAM symbol (block 260). The receiving device may de-map the QAM symbol in accordance with the constellation map to produce coded data (block 265). The receiving device may decode the coded data to produce data (block 270). The receiving device may process the data (block 275).

It is possible to design constellation maps using Euclidean distance between points of the constellation maps as a design criterion. The use of Euclidean distance to place an upper bound on a metric, such as bit error rate (BER), may yield a tight bound in high signal to noise ratio (SNR) environments. However, communications systems that use coded transmission typically operate in low SNR environments. Hence, a different design criterion may be needed to accommodate requirements of coded transmissions in a low SNR environment.

According to an example embodiment, optimization of an a posteriori error rate, such as a posteriori bit error rate (BER), a posteriori packet error rate (PER), a posteriori frame error rate (FER), and the like, is used as a design criterion for constellation design.

For discussion purposes, consider a design criterion of minimizing the a posteriori bit error rate $$P_{err\_bit,ps} = \frac{1}{K}\sum_{i=1}^{K}\left(1 - \overline{Pr\{\theta_i = \hat{\theta}_i\}}\right) = \frac{1}{K}\sum_{i=1}^{K}\left(1 - \overline{\frac{1}{2}\left(1 + \theta_i \tanh\left(\frac{LLR_i}{2}\right)\right)}\right) = \frac{1}{K}\sum_{i=1}^{K}\frac{1}{2}\left(1 - \overline{\theta_i \tanh\left(\frac{LLR_i}{2}\right)}\right) \quad (1)$$

where $$LLR_i = \log\left(\frac{P_{ps}(\theta_i = 1)}{P_{ps}(\theta_i = -1)}\right)$$

is the logarithmic likelihood ratio for the i-th bit, included in the K bit constellation.

Let $S=[s_1, s_2, \ldots s_M]^T$ be an M dimensional vector of modulated symbols, where each modulated symbol $s_m$ being dependent on the same K dimensioned vector of binary symbols $\Theta=[\theta_1, \theta_2, \ldots \theta_K]$, where $\theta_k \in \{-1;1\}$. In other words, vector S is the function of the binary vector, i.e., S ($\Theta$) has $2^K$ possible values among the whole set of the multi-dimensional constellation.

Let S ($\Theta$) be the vector being observed in Gaussian background noise:

$$Y=S(\Theta)+\eta,$$

where $\eta$ is an M dimensioned vector of samples of complex Gaussian noise with zero mean and covariance matrix $R_\eta=2\sigma_\eta^2 I_M$, where $I_M$ is an M-by-M identity matrix, $\sigma_\eta^2$ is the variance of either the I or Q component of noise.

All available information about transmitted combination $\Theta$ is contained in the following posteriori distribution:

$$P_{ps}(\Theta|Y)=C\Lambda(Y|\Theta)P_{pr}(\Theta),$$

where $P_{pr}$ ($\Theta$) is an a priori distribution of the vector of binary variables, $\Lambda(Y|\Theta)$ is a likelihood function, C is a normalizing constant, which does not depend on $\Theta$.

A likelihood function may be expressed as:

$$\Lambda(Y \mid \Theta) = C_2 \exp\left(-\frac{1}{2\sigma_\eta^2}(Y - S(\Theta))^H (Y - S(\Theta))\right),$$

where $(\ )^H$ is a conjugate transpose operation.

For equiprobable combinations of vector $\Theta$, $$P_{pr}(\Theta) = \frac{1}{2^K}.$$

Therefore, a posteriori distribution is determined only by the likelihood function. The logarithm of the likelihood ratio expressible as $$\lambda_k = LLR_k = \log\frac{P_{ps}(\theta_k = 1 \mid Y)}{P_{ps}(\theta_k = -1 \mid Y)}$$

is often used for calculating soft estimates, where $$P_{ps}(\theta_k \mid Y) = \sum_{\substack{\theta_i \in \{-1;1\} \\ i=\overline{1,K}, i\neq k}} P_{ps}(\Theta \mid Y)$$

is marginal distribution of the k-th binary random value $\theta_k$.

It is possible to show that a marginal distribution of binary random value $\theta_k \in \{-1;1\}$ is completely defined by the $\lambda_k$ parameter and is expressible as $$P_{ps}(\theta_k \mid Y) = \frac{1}{2}\left(1 + \theta_k \tanh\left(\frac{\lambda_k}{2}\right)\right).$$

A hard estimate (based on maximum a posteriori probability) of a transmitted binary symbol is expressible as $$\hat{\theta}_k = \operatorname{argmax}\{P_{ps}(\theta_k \mid Y)\}\big|_{\theta_k \in \{-1;1\}} = \operatorname{sgn}\left(\tanh\left(\frac{\lambda_k}{2}\right)\right) = \operatorname{sgn}(\lambda_k).$$

Let binary symbol $\upsilon_k$ be transmitted and its estimate denoted $\hat{\theta}_k$ be calculable. The binary symbol comprising $\epsilon_k = \hat{\theta}_k \upsilon_k$ describes the bit error, i.e., if $\epsilon_k = -1$ then this bit is received in error. It is also possible to express the a posteriori distribution for $\epsilon_k$ as $$P_{ps}(\varepsilon_k \mid \Theta, \eta) = \frac{1}{2}\left(1 + \varepsilon_k \vartheta_k \tanh\left(\frac{\lambda_k(\Xi, \eta)}{2}\right)\right) = \frac{1}{2}\left(1 + \varepsilon_k \tanh\left(\frac{\vartheta_k \lambda_k(\Xi, \eta)}{2}\right)\right),$$

where $\Xi = [\upsilon_1, \upsilon_2, \ldots \upsilon_K]$ is a vector of transmitted binary symbols.

The a posteriori bit error rate may be defined as an average probability of event $\epsilon_k = -1$, i.e., $$BER_k = \langle Pr\{\varepsilon_k = -1\}\rangle = \frac{1}{2}\left(1 - \left\langle \tanh\left(\frac{\vartheta_k \lambda_k(\Xi, \eta)}{2}\right)\right\rangle\right),$$

where $\langle\,\rangle$ is an averaging operation on both noise $\eta$ and all possible choices of $\Xi$. The average a posteriori error rate on all bits may be expressible as $$BER = \frac{1}{K}\sum_{k=1}^{K} BER_k = \frac{1}{2} - \frac{1}{2K}\sum_{k=1}^{K}\left\langle \tanh\left(\frac{\vartheta_k \lambda_k(\Xi, \eta)}{2}\right)\right\rangle.$$

It is possible to simplify the a posteriori error rate by eliminating the noise component, i.e., $\eta = 0$. The average a posteriori error rate on all bits may then be expressible as $$\overline{BER} = \frac{1}{2} - \frac{1}{2K}\sum_{k=1}^{K}\left\langle \tanh\left(\frac{\vartheta_k \lambda_k(\Xi, \eta = 0)}{2}\right)\right\rangle.$$

It is possible to use a maximum a posteriori (MAP) demodulation algorithm to determine the $\lambda_k$ parameter, as an example $$\lambda_k(\Xi) = \log\frac{\displaystyle\sum_{\substack{\theta_i \in \{-1;1\} \\ i=\overline{1,K}, i\neq k}} \exp\left(\begin{matrix} -\frac{1}{2\sigma_\eta^2}(S(\Xi) - S(\theta_1, \ldots \theta_k = 1, \ldots \theta_K))^H \\ (S(\Xi) - S(\theta_1, \ldots \theta_k = 1, \ldots \theta_K)) \end{matrix}\right)}{\displaystyle\sum_{\substack{\theta_i \in \{-1;1\} \\ i=\overline{1,K}, i\neq k}} \exp\left(\begin{matrix} -\frac{1}{2\sigma_\eta^2}(S(\Xi) - S(\theta_1, \ldots \theta_k = -1, \ldots \theta_K))^H \\ (S(\Xi) - S(\theta_1, \ldots \theta_k = -1, \ldots \theta_K)) \end{matrix}\right)}.$$

The minimization of the $\overline{BER}$ function may be provided by selection of one-dimensional or multi-dimensional constellation points, as described by the S ($\Theta$) function. An optimal constellation search may be utilized. The M values of elements of the S ($\Theta$) function correspond to each combination of the $\Theta$ binary vector. Hence, the complex $2^K \times M$ dimensioned matrix S may be an optimization result, with each column of the matrix S representing one point of the M dimensioned constellation and each row representing one complex constellation. The matrix S provides the minimum of $\overline{BER}$ with a constraint on a constant average power of each constellation, i.e., for any m=1, . . . , M the condition $$\frac{1}{2^K}\sum_{i=1}^{2^K} |S^{(i,m)}|^2 = 1$$

is met.

According to an example embodiment, the minimization of the $\overline{BER}$ function may be performed using numerical methods for optimization. Gradient methods are generally effective in terms of convergence speed. The optimization algorithm may be iterative and may be described as $$S_j = S_{j-1} - \gamma\nabla,$$

where $\gamma$ is a weighting factor, $$\nabla = \left.\frac{d\overline{BER}}{dS}\right|_{S=S_{j-1}}$$

is a gradient of the $\overline{BER}$ function with respect to the matrix S in the points of $S = S_{j-1}$. Constraint normalization may be included with a normalization operation expressible as $$.\tilde{S}_j = S_j(\operatorname{diag}(S_j^H S_j))^{-1}.$$

A simplifying step may include changing the gradient by its incremental ratio approximation, expressible as $$\nabla^{(k,m)} = \frac{\overline{BER}(S^{(k,m)} + \Delta S) - \overline{BER}(S^{(k,m)} - \Delta S)}{2\Delta S},$$

where $S^{(k,m)}$ is a (k,m)-th element of matrix S, and $\Delta S$ is an increment of the argument (shift of the constellation point).

Since the approximation of the gradient is being determined, the direction of the constellation correction may be incorrect. It is proposed to use a modified procedure with a built-in check. The modified optimization procedure may be described as, with other forms of corrections and stopping conditions being possible:

a. Determine shifted constellation points $$S_{j-1,+\Delta}^{(k,m)}=S_{j-1}^{(k,m)}+\Delta S,\ S_{j-1,-\Delta}^{(k,m)}=S_{j-1}^{(k,m)}-\Delta S;$$

b. Normalize constellations with shifted points $$\tilde{S}_{j-1,+\Delta_{km}}^{(:,m)}=\frac{S_{j-1,+\Delta_{km}}^{(:,m)}}{\sqrt{\frac{1}{2^K}\sum_{i=1}^{2^K}\left|S_{j-1,+\Delta_{km}}^{(i,m)}\right|^2}},$$

$$\tilde{S}_{j-1,-\Delta_{km}}^{(:,m)}=\frac{S_{j-1,-\Delta_{km}}^{(:,m)}}{\sqrt{\frac{1}{2^K}\sum_{i=1}^{2^K}\left|S_{j-1,-\Delta_{km}}^{(i,m)}\right|^2}};$$

c. Determine gradient $$\nabla_j^{(k,m)}=\frac{\overline{BER}(\tilde{S}_{j-1,+\Delta_{km}})-\overline{BER}(\tilde{S}_{j-1,-\Delta_{km}})}{2\Delta S},$$

where $\tilde{S}_{j-1,+\Delta_{km}}=[S_{j-1}^{(:,1)}, S_{j-1}^{(:,1)}, \ldots, \tilde{S}_{j-1,-\Delta_{km}}^{(:,m)}, \ldots, S_{j-1}^{(:,M)}]$;

d. Normalize gradient $$\tilde{\nabla}_j=\frac{\nabla_j}{\|\nabla_j\|^2};$$

e. Determine new constellation $S_j=S_{j-1}-\gamma\tilde{\nabla}_j$;

f. Normalize constellation $\tilde{S}_j=S_j(\mathrm{diag}(S_j^H S_j))^{-1}$;

g. Determine current value of $\overline{BER}(\tilde{S}_j)$;

h. Constellation step is good if $\overline{BER}(\tilde{S}_j)<\overline{BER}(\tilde{S}_{j-1})$, return to (a);

i. Constellation step is bad if $\overline{BER}(\tilde{S}_j)\geq\overline{BER}(\tilde{S}_{j-1})$, and reduce $\gamma$ factor by a scaling factor (e.g., $\gamma=0.1\cdot\gamma$) and return to (e) until $\gamma\geq\gamma_{min}$.

According to another example embodiment, the minimization of the $\overline{BER}$ function may be performed using numerical methods for optimization. Methods of random search (optimization) using stochastic approximation are used. An example method for minimizing the $\overline{BER}$ function is as follows:

1. Form a matrix of independent Gaussian random increments with zero mean and unit variance is formed $\Delta S_j \sim N$ (O, I);

2. Determine two sets of constellations with opposite directions of change of shifted constellation points $S_j^+=S_{j-1}+\beta\Delta S_j$, and $S_j^-=S_{j-1}-\beta\Delta S_j$, where $\beta$ is an algorithm parameter;

3. Normalize constellations with shifted points $$\tilde{S}_j^+=S_j^+(\mathrm{diag}\ ((S_j^+)^H S_j^+))^{-1},\ \tilde{S}_j^-=S_j^-(\mathrm{diag}\ ((S_j^-)^H S_j^-))^{-1};$$

4. Determine values of posteriori probabilities $$\overline{BER}(\tilde{S}_j^+)\text{ and }\overline{BER}(\tilde{S}_j^-);$$

5. Determine new constellation $$S_j=S_{j-1}-\gamma_j\alpha\ sgn(\overline{BER}(\tilde{S}_j^+)-\overline{BER}(\tilde{S}_j^-))\Delta S_j\text{ where }\gamma_j,\ \alpha\text{ are algorithm parameters;}$$

6. Normalize the constellation $\tilde{S}_j=S_j(\mathrm{diag}(S_j^H S_j))^{-1}$;

7. Determine current value of $\overline{BER}(\tilde{S}_j)$;

8. Constellation step is good if $\overline{BER}(\tilde{S}_j)<\overline{BER}(\tilde{S}_{j-1})$, increase $\gamma_{j+1}=A_{\gamma,\uparrow}\gamma_j$ and return to (1) for next iteration;

9. Constellation step is bad if $\overline{BER}(\tilde{S}_j)\geq\overline{BER}(\tilde{S}_{j-1})$, reduce factor $\gamma_{j+1}=A_{\gamma,\downarrow}\gamma_j$ and return to (5) until $\gamma_j\geq\gamma_{min}$. If $\gamma_j<\gamma_{min}$ and $\overline{BER}(\tilde{S}_j)\geq\overline{BER}(\tilde{S}_{j-1})$, return to (1) without constellation correction (i.e., set $S_j=S_{j-1}$);

10. Iteration is over when the number of iteration reaches a threshold.

Figure 3:
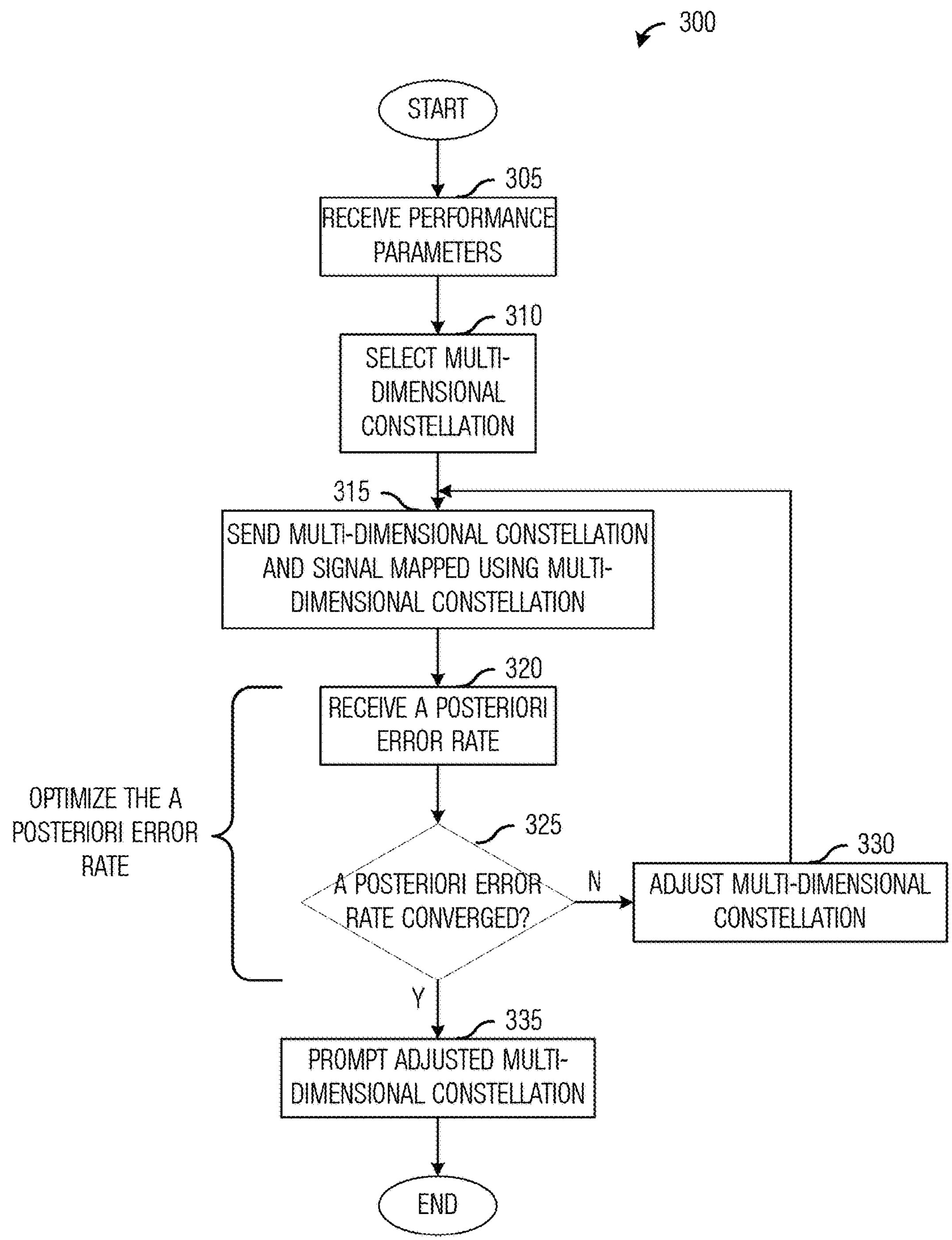
FIG. 3 illustrates a flow diagram of example operations in a designing device according to example embodiments described herein.

FIG. 3 illustrates a flow diagram of example operations 300 in a designing device. Operations 300 may be indicative of operations occurring in a designing device as the designing device designs a constellation with a posteriori error rate as a design criterion.

Operations 300 may begin with the designing device receiving performance parameters for a communications system (block 305). The performance parameters may be used by the designing device to design the constellation. Examples of performance parameters may include a number of bits, dimensions of the constellation, assumptions regarding the communications channels, and the like. The designing device may select a constellation (block 310). The constellation may be one-dimensional or multi-dimensional, with the dimension potentially being determined by the performance parameters, communications device capability, and the like. The constellation selected may contain randomly selected constellation points. The constellation selected may be selected from a plurality of candidate constellations. The constellation selected may be selected from constellations used in previous designs.

The designing device may send the selected constellation and a signal mapped using the selected constellation to a receiving device (block 315). The designing device may send an indicator of the selected constellation, as well as transmit a signal mapped using the selected constellation to the receiving device. The designing device may receive a posteriori error rate from the receiving device (block 320). The a posteriori error rate may be a BER, a PER, a FER, and the like, measured by the receiving device using the selected constellation and the signal transmitted by the designing device. The designing device may determine if the a posteriori error rate has converged (block 325). Determining if the a posteriori error rate has converged may be accomplished by comparing the a posteriori error rate with a threshold. Alternatively, successive a posteriori error rates may be compared with each other and if a threshold is met, it may be said that the a posteriori error rate has converged. If the a posteriori error rate has not converged, the designing device may adjust the constellation (block 330). As an illustrative example, the designing device may move one or more constellation points in the constellation. The designing device may return to block 315 to send the constellation as adjusted and a signal mapped using the constellation as adjusted to the receiving device. If the a posteriori error rate has converged, the designing device may prompt the constellation to the devices (block 335). The designing device may send the constellation to the devices. The designing device may save the constellation to a memory or a database. Collectively, blocks 310, 315, 320, 325, and 330 may be referred to as designing the constellation. Blocks 320, 325, and 330 may be collectively referred to as adjusting the constellation in accordance with a design criterion.

Although the discussion of operations 300 focuses on the designing device operating in conjunction with a receiving device to design the constellation, the designing device may operate by itself to design the constellation. Instead of transmitting the signal mapped using the constellation to the receiving device, the designing device may model the impact of a channel model, modeling channel noise and/or interference, on the signal and derive the a posteriori error rate by itself. In such a situation, the design of the constellation does not require the designing device to interact with the receiving device. Furthermore, communications system resources do not have to be dedicated to the constellation design process. When operating by itself, designing device may not need to perform blocks 315 and 320. Instead, designing device may derive the a posteriori error rate in accordance with the constellation. Other parts of operation 300 may remain the same.

Figure 4:
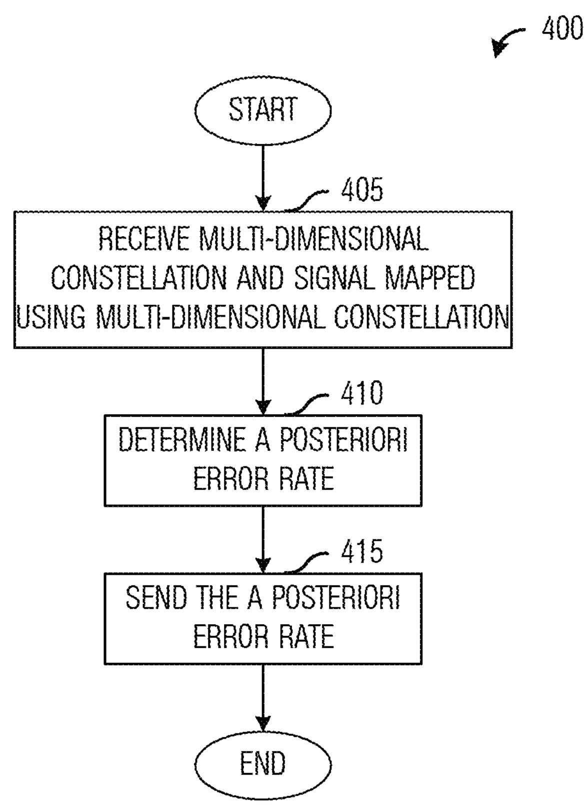
FIG. 4 illustrates a flow diagram of operations in a receiving device participating in constellation design according to example embodiments described herein.

FIG. 4 illustrates a flow diagram of operations 400 in a receiving device participating in constellation design. Operations 400 may be indicative of operations occurring in a receiving device as the receiving device participates in constellation design with a designing device.

Operations 400 may begin with the receiving device receiving a constellation and a signal mapped using the constellation (block 405). The receiving device may receive an indication of the constellation and a transmission including the signal mapped using the constellation. The receiving device may determine a posteriori error rate (block 410). The receiving device may feedback the a posteriori error rate to the designing device (block 415). The receiving device may feedback an indication of the a posteriori error rate.

Figure 5A:
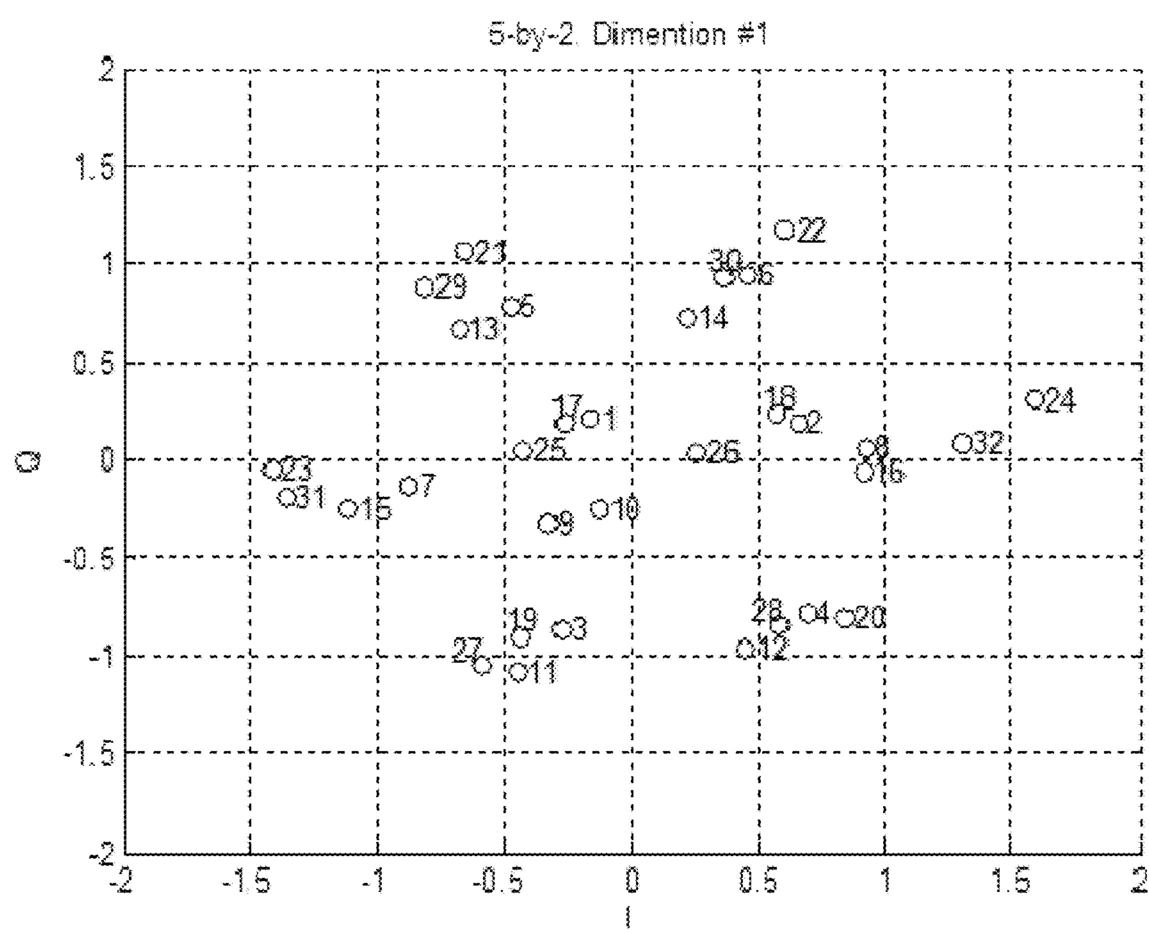
FIGS. 5*a* and 5*b* illustrate diagrams of dimensions 1 and 2 of a 2-dimensional constellation according to example embodiments described herein.
Figure 5B:
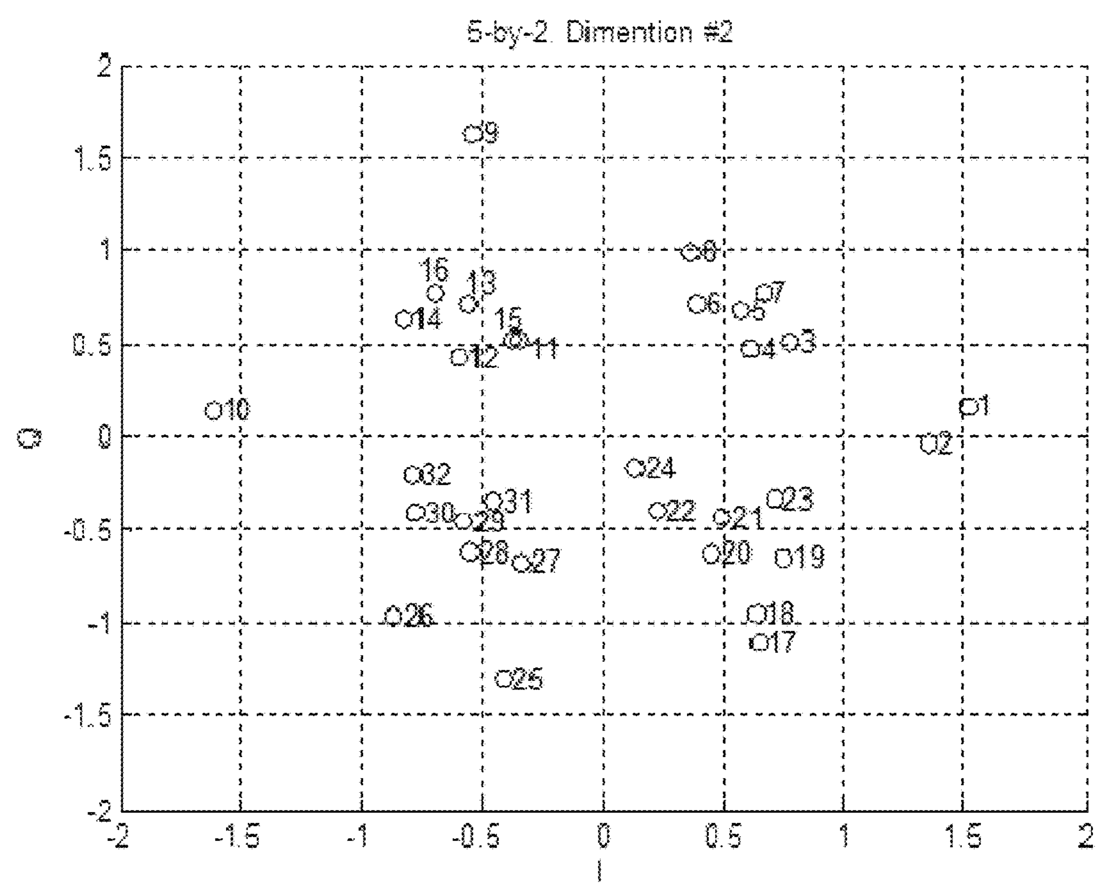

FIGS. 5*a* and 5*b* illustrate diagrams of dimensions 1 and 2 of a 2-dimensional constellation with each dimension including 32 constellation points, where the multi-dimensional constellation is designed using techniques presented herein.

Figure 6A:
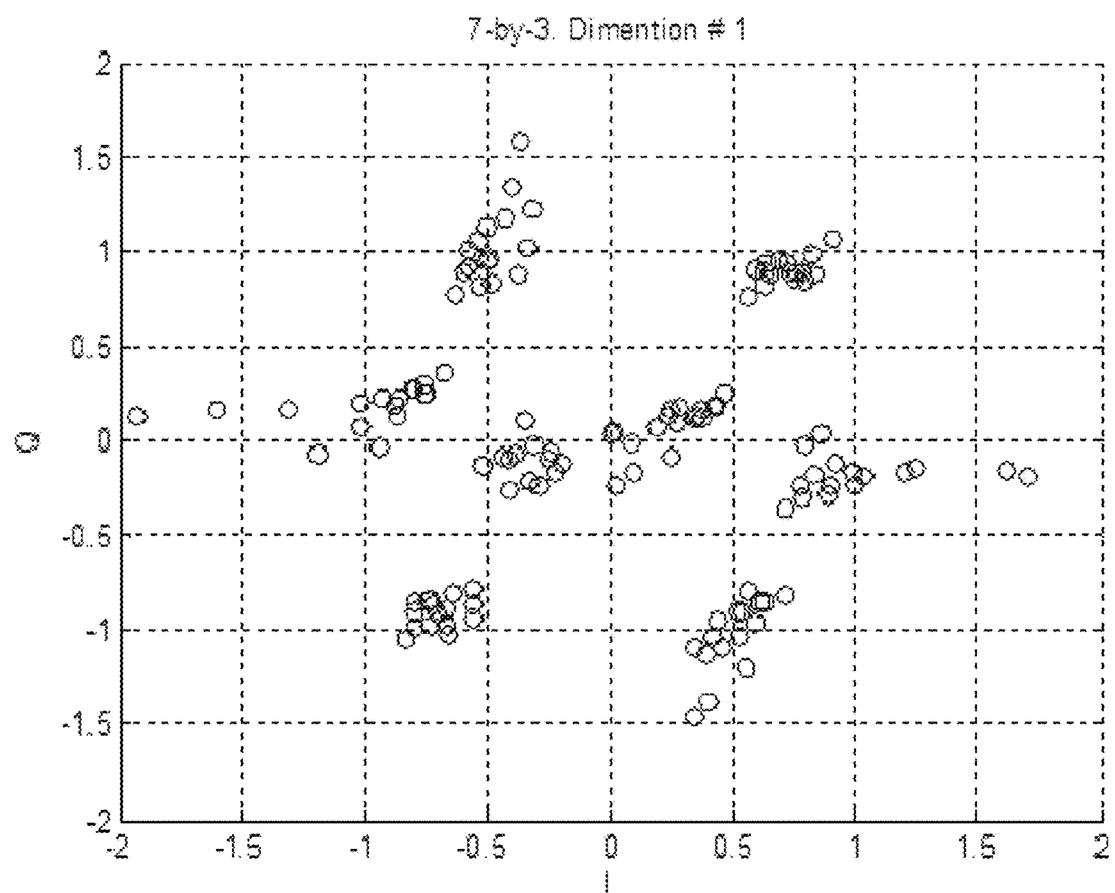
FIGS. 6*a*-6*c* illustrate diagrams of dimensions 1, 2, and 3 of a 3-dimensional constellation according to example embodiments described herein.
Figure 6B:
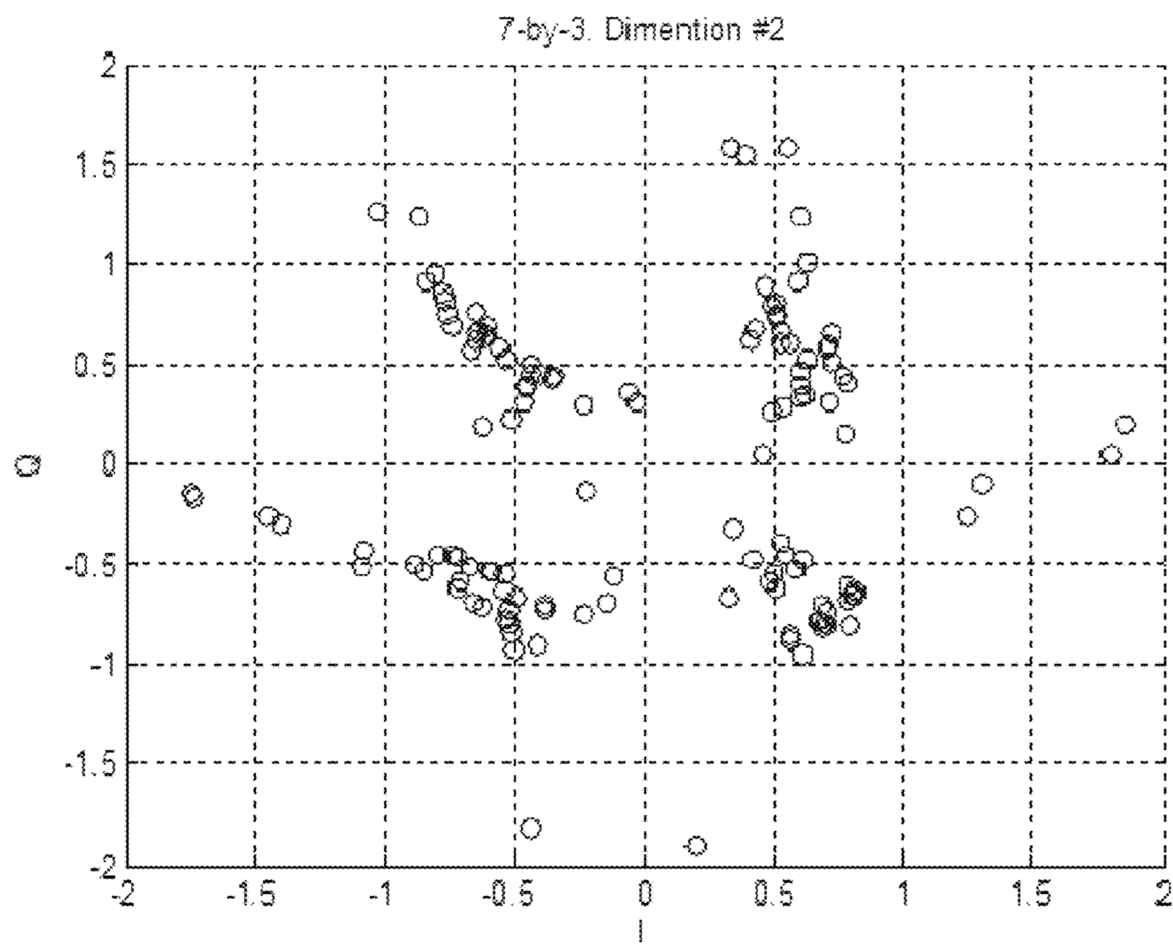
Figure 6C:
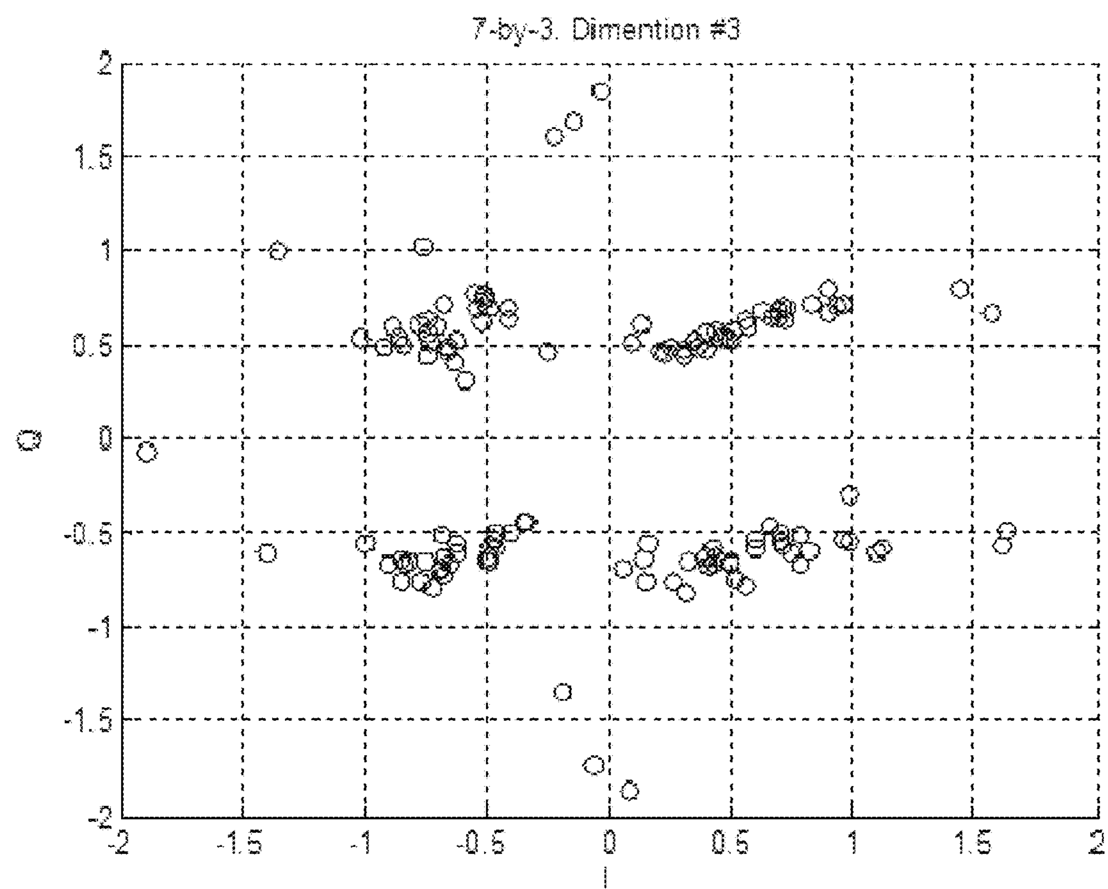

FIGS. 6*a*-6*c* illustrate diagrams of dimensions 1, 2, and 3 of a 3-dimensional constellation with each dimension including 128 constellation points, where the multi-dimensional constellation is designed using techniques presented herein.

Figure 7:
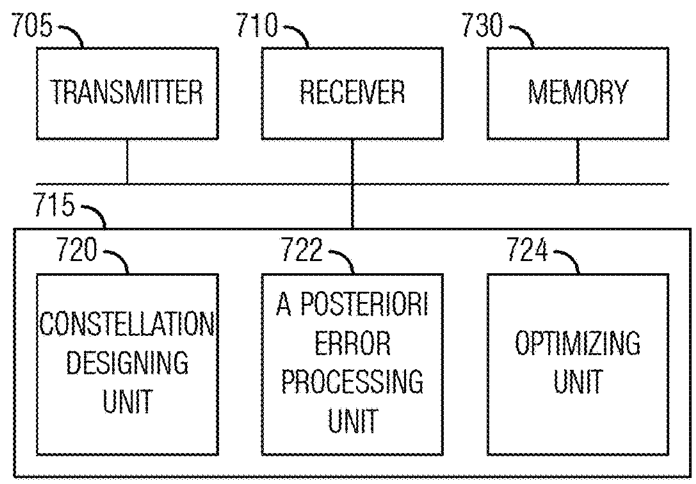
FIG. 7 illustrates an example first communications device according to example embodiments described herein.

FIG. 7 illustrates an example first communications device 700. Communications device 700 may be an implementation of a designing device. Communications device 700 may be implemented as an integrated circuit or a chipset. Communications device 700 may be used to implement various ones of the embodiments discussed herein. As shown in FIG. 7, a transmitter 705 is configured to transmit packets, constellations, constellation indicators, signals mapped using constellations, and the like. Communications device 700 also includes a receiver 710 that is configured to receive packets, a posteriori error rates, a posteriori error rate indicators, and the like.

A constellation design unit 720 is configured to design constellations to meet performance parameters of a communications system. Constellation design unit 720 is configured to design the constellations based on a design criterion, such as a posteriori error rate (e.g., BER, PER, FER, and the like). Constellation design unit 720 is configured to adjust constellation points. A posteriori error processing unit 722 is configured to process received a posteriori error rates or indicators thereof. An optimizing unit 724 is configured to determine convergence of the a posteriori error rates using optimization techniques such as gradient methods, random search techniques, stochastic approximations, and the like. A memory 730 is configured to store constellation maps, performance parameters, a posteriori error rates, convergence thresholds, and the like.

The elements of communications device 700 may be implemented as specific hardware logic blocks. In an alternative, the elements of communications device 700 may be implemented as software executing in a processor, controller, application specific integrated circuit, or so on. In yet another alternative, the elements of communications device 700 may be implemented as a combination of software and/or hardware.

As an example, receiver 710 and transmitter 705 may be implemented as a specific hardware block, while constellation designing unit 720, a posteriori error processing unit 722, and optimizing unit 724 may be software modules executing in a microprocessor (such as processor 715) or a custom circuit or a custom compiled logic array of a field programmable logic array. Constellation designing unit 720, a posteriori error processing unit 722, and optimizing unit 724 may be modules stored in memory 730.

Figure 8:
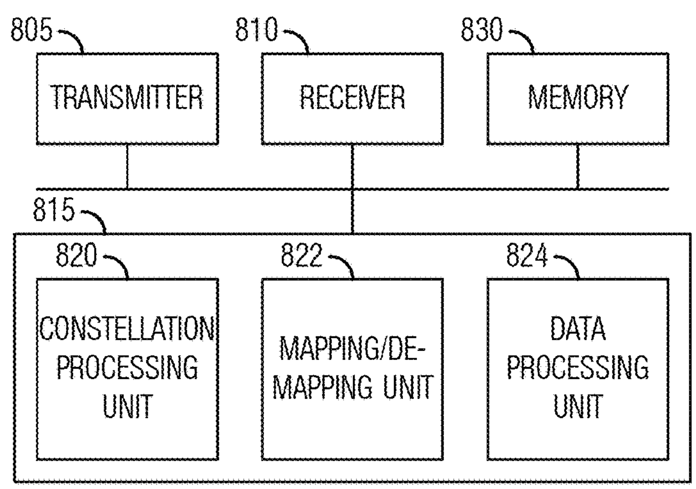
FIG. 8 illustrates an example second communications device according to example embodiments described herein.

FIG. 8 illustrates an example second communications device 800. Communications device 800 may be an implementation of a communications device, such as a transmitting device and/or a receiving device. Communications device 800 may be implemented as an integrated circuit or a chipset. Communications device 800 may be used to implement various ones of the embodiments discussed herein. As shown in FIG. 8, a transmitter 805 is configured to transmit packets, signals mapped using constellations, and the like. Communications device 800 also includes a receiver 810 that is configured to receive packets, signals mapped using constellations, and the like.

A constellation processing unit 820 is configured to determine a constellation for communications device 800. Constellation processing unit 820 is configured to determine the constellation from an indicator received by communications device 800. Constellation processing unit 820 is configured to retrieve the constellation from a memory or database. A mapping/de-mapping unit 822 is configured to map data for transmission using the constellation. Mapping/de-mapping unit 822 is configured to de-map received data using the constellation. A data processing unit 824 is configured to process data prior to mapping. Data processing unit 824 is configured to process data after de-mapping. A memory 830 is configured to store constellation maps, data, indicators, and the like.

The elements of communications device 800 may be implemented as specific hardware logic blocks. In an alternative, the elements of communications device 800 may be implemented as software executing in a processor, controller, application specific integrated circuit, or so on. In yet another alternative, the elements of communications device 800 may be implemented as a combination of software and/or hardware.

As an example, receiver 810 and transmitter 805 may be implemented as a specific hardware block, while constellation processing unit 820, mapping/de-mapping unit 822, and data processing unit 824 may be software modules executing in a microprocessor (such as processor 815) or a custom circuit or a custom compiled logic array of a field programmable logic array. Constellation processing unit 820, mapping/de-mapping unit 822, and data processing unit 824 may be modules stored in memory 830.

Figure 9:
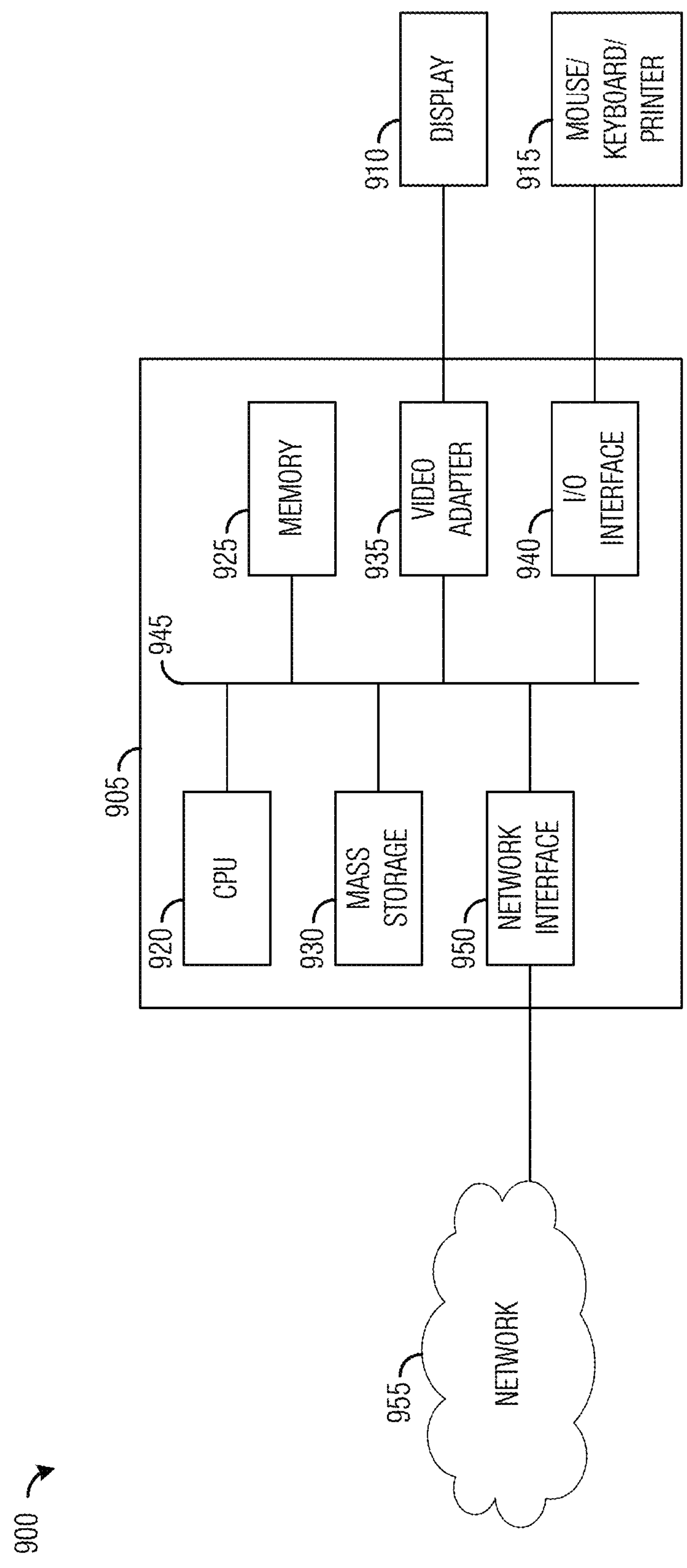
FIG. 9 is a block diagram of a processing system that may be used for implementing the devices and methods disclosed herein

FIG. 9 is a block diagram of a processing system 900 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system or a portion thereof may be implemented on an integrated circuit, or a plurality of integrated circuits. In other words, the processing system or a portion thereof may be implemented as a chipset. The processing system may comprise a processing unit 905 equipped with one or more input/output devices, such as a human interface 915 (including speaker, microphone, mouse, touchscreen, keypad, keyboard, printer, and the like), display 910, and so on. The processing unit may include a central processing unit (CPU) 920, memory 925, a mass storage device 930, a video adapter 935, and an I/O interface 940 connected to a bus 945.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces 950, which may comprise wired links, such as an Ethernet cable or the like, and/or wireless links to access nodes or different networks 955. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Although the present disclosure and its advantages have been described in detail, it should be understood that various changes, substitutions and alterations can be made herein without departing from the spirit and scope of the disclosure as defined by the appended claims.

What is claimed is:

1. A method for operating a transmitting device, the method comprising:

mapping, by the transmitting device, data to a transmission symbol in accordance with a constellation map assigned to a receiving device, wherein the constellation map is designed in accordance with a posteriori error rate derived from a transmitted signal; and transmitting, by the transmitting device, the transmission symbol.

2. The method of claim 1, further comprising determining the constellation map associated with the receiving device.

3. The method of claim 2, wherein determining the constellation map comprises receiving a first indicator of the constellation map assigned to the receiving device.

4. The method of claim 2, wherein determining the constellation map comprises assigning the constellation map to the receiving device.

5. The method of claim 1, further comprising signaling a second indicator of the constellation map to the receiving device.

6. The method of claim 1, wherein the transmitted signal is transmitted by the transmitting device, and wherein the method further comprises:

selecting an initial constellation map;

determining the a posteriori error rate of a transmission symbol mapped using the initial constellation map; and iteratively adjusting the initial constellation map until the a posteriori error rate meets a threshold, thereby obtaining the constellation map.

7. The method of claim 6, wherein determining the a posteriori error rate comprises:

transmitting the transmission symbol and an indicator of the initial constellation map to a second device; and receiving the a posteriori error rate from the second device.

8. The method of claim 6, wherein determining the a posteriori error rate comprises:

modeling a received version of the transmission symbol in accordance with a channel model; and deriving the a posteriori error rate from the received version of the transmission symbol.

9. The method of claim 1, wherein the constellation map comprises a multi-dimensional constellation map.

10. A method for operating a receiving device, the method comprising:

receiving, by the receiving device, a transmission symbol from a transmitting device;

de-mapping, by the receiving device, the transmission symbol in accordance with a constellation map thereby producing received data, wherein the constellation map is designed in accordance with a posteriori error rate derived from a transmitted signal; and processing, by the receiving device, the received data.

11. The method of claim 10, further comprising:

determining an assignment of the constellation map; and retrieving the constellation map from a memory in accordance with the assignment.

12. The method of claim 11, wherein determining the assignment comprises one of receiving the assignment in a message, retrieving the assignment from the memory, retrieving the assignment from a server, and assigning the constellation map to itself.

13. The method of claim 10, wherein processing the received data comprises:

decoding the received data, thereby producing decoded data; and processing the decoded data.

14. A transmitting device comprising:

a processor; and a non-transitory computer readable storage medium storing programming for execution by the processor, the programming including instructions to:

map data to a transmission symbol in accordance with a constellation map assigned to a receiving device, wherein the constellation map is designed in accordance with a posteriori error rate derived from a transmitted signal, and transmit the transmission symbol.

15. The transmitting device of claim 14, wherein the programming includes instructions to determine the constellation map associated with the receiving device.

16. The transmitting device of claim 15, wherein the programming includes instructions to one of receive a first indicator of the constellation map assigned to the receiving device, and assign the constellation map to the receiving device.

17. The transmitting device of claim 14, wherein the programming includes instructions to signal a second indicator of the constellation map to the receiving device.

18. The transmitting device of claim 14, wherein the transmitted signal is transmitted by the transmitting device, and wherein the programming includes instructions to select an initial constellation map, determine the a posteriori error rate of a transmission symbol mapped using the initial constellation map, and iteratively adjust the initial constellation map until the a posteriori error rate meets a threshold, thereby obtaining the constellation map.

19. A receiving device comprising:

a processor; and a non-transitory computer readable storage medium storing programming for execution by the processor, the programming including instructions to:

receive a transmission symbol from a transmitting device, de-map the transmission symbol in accordance with a constellation map thereby producing received data, wherein the constellation map is designed in accordance with a posteriori error rate derived from a transmitted signal, and process the received data.

20. The receiving device of claim 19, wherein the programming includes instructions to determine an assignment of the constellation map, and retrieve the constellation map from a memory in accordance with the assignment.

21. The receiving device of claim 19, wherein the programming includes instructions to decode the received data, thereby producing decoded data, and process the decoded data.

* * * * *